April 7, 1925.
E. W. KINGSBURY
EYESHIELD
Filed Feb. 10, 1923
1,532,317
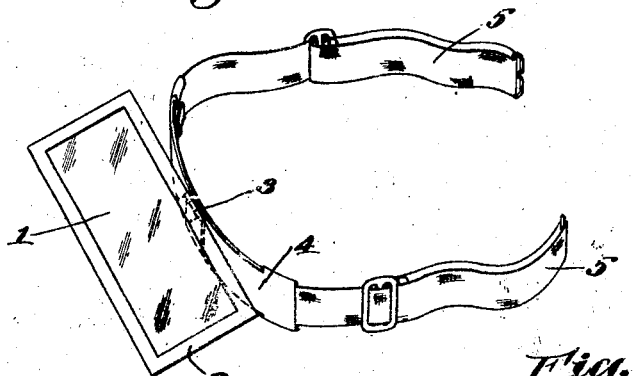
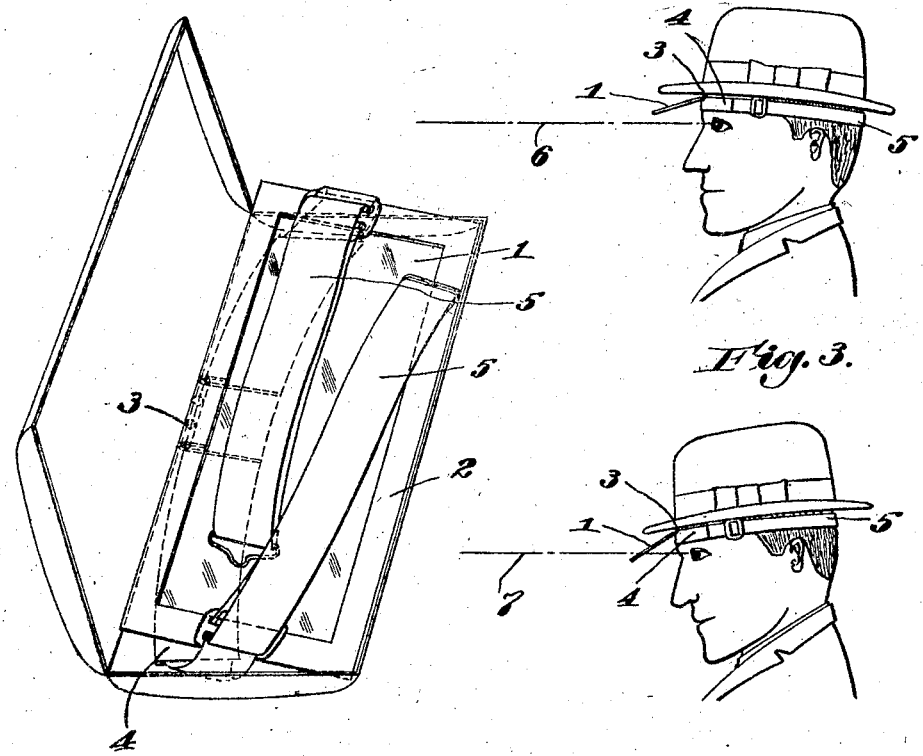

Patented Apr. 7, 1925.

1,532,317

UNITED STATES PATENT OFFICE.

EDMUND WINCHESTER KINGSBURY, OF FRAMINGHAM, MASSACHUSETTS.

EYESHIELD.

Application filed February 10, 1923. Serial No. 618,303.

*To all whom it may concern:*

Be it known that I, EDMUND WINCHESTER KINGSBURY, a citizen of the United States, residing at Framingham, in the county of Middlesex and State of Massachusetts, have invented certain new and useful Improvements in Eyeshields, of which the following is a specification, reference being had therein to the accompanying drawings.

The object of my invention is to provide a screen or shield for the eyes of the user, at once available, whenever and while a blinding light interferes with the lines of vision demanded of him.

For example, my screen is of very great utility to motorists at night, in avoiding the disconcerting glare of the headlights of an oncoming motor car.

It is common knowledge that while the lights of a motor car are sufficient to show up to the driver the character of the middle and the sides of a road in front of the car, they become, and remain, utterly useless during the period of time the lights of an oncoming car are visible, close at hand. In fact, during this period, safety demands that the driver, whose eyes are dazzled, shall bring his car to a dead stop beside the road until the oncoming car has gone by, or shall move it slowly ahead, but without knowing what if anything may be in the way, in the pitchy darkness fearfully intensified by the light's brilliancy.

Obviously, in the dark, one's best sight is his normal sight, and smoked or colored glasses cannot be comfortably or safely used. It is also obvious that should a glaring headlight appear and approach, some screen or shield for the eyes of a motor driver is at once a great necessity, if he intends to continue going on at normal speed. Now my invention permits him to do so; and may be said to reside, broadly, in a device made up of a piece of transparent material through which a person may observe a blinding light without objectionable interference with his vision, and means whereby said piece may be removably mounted on his head, so that when his head is in normal position, said piece is not in his normal line of vision, but may, by a slight inclination of the head, be moved into a position to intercept the blinding rays of light and not seriously interfere with his sight of adjacent objects, and after the blinding lights have ceased, said piece may, by a slight opposite inclination of the head, be moved out of his said normal line of vision; his normal line of vision at once becoming unobstructed.

In the drawings, illustrating the principle of my invention, and the best mode now known to me of embodying it in operative structure, Fig. 1 is a perspective view of such a structure;

Fig. 2 shows it in side elevation removably secured to the head of the user, the shield being above its normal line of sight;

Fig. 3 is a like view, the shield being in the said normal line of sight; and

Fig. 4 illustrates the disposition of the shield, in a container for it.

A small sheet 1 of colored glass, celluloid or other suitable material of a transparent nature is enclosed with a metal frame 2. Said frame is hinged at its central portion 3 to a thin flexible strip of steel 4, for example, designed to rest against the forehead; an adjustable head strap 5, say of elastic material, being secured to said forehead strip 4, and arranged to fasten around the head.

The shield, when worn, ready for use, is held in a position shown in Fig. 2. The small shield is above the normal line of vision 6, and in no way interferes with it; it is out of use; but, should a glare of light suddenly confront the user, the latter, by a slight forward inclination of the head, as shown in Fig. 3, would bring the shield down into the line of the glaring light 7, which would then be seen through the colored shield 1, and become to the observer sufficiently dimmed to be not dangerously objectionable; while once the dazzling light is passed, a mere raising of the head puts the shield once more out of the line of vision of normal sight 1, Fig. 2.

In short, the shield, when worn, which would be instantly ready for use when needed; and, at once, when not needed, could be moved out of the line of vision; thus making, for example, driving at night safer and pleasanter than it has been heretofore.

It will be further observed that in the preferred construction of my device it is important that the shield-frame shall be supported in a substantial way and at the proper angle with reference to the forehead of the wearer; to provide this support, I use the flat stiff band 4 curved transversely to fit flat against the forehead of the wearer with means to hold it tightly thereagainst, so as to thereby prevent the shield-frame and said band 4 from tilting downwardly with reference to the forehead. By means of this forehead-band 4 and an adjustable head-band, the device may be comfortably fastened to the head of the wearer in such position that the shield-frame will project out forwardly and lie, when the head of the wearer is in normal upright position, just above the line of vision and thus be entirely out of the way under normal conditions. I have shown the shield-frame connected to this stiff band 4 by means of a hinge, but it will be understood that other ways of connecting the band may be resorted to without departing from my invention.

It is to be observed that I do not limit myself to the structure herein shown and described, for the principle employed may be embodied in numerous forms; and desiring to protect my invention in the boardest manner legally possible,

What I claim is:

A device of the class set forth embodying a thin piece of material through which a person may observe a blinding light without objectionable interference with his vision, a frame in which said material is mounted, a curved band adapted to fit flat against the forehead of said person, this band being attached to the upper edge of said frame, said frame projecting forwardly and downwardly from said point of attachment at an angle which will maintain said frame above the line of vision when the head of the wearer is in normal vertical position, and an adjustable head-band attached to said forehead-band for clamping the forehead-band against the head of the wearer.

In testimony whereof I hereunto affix my signature.

EDMUND WINCHESTER KINGSBURY.